US012571520B2

(12) United States Patent
Burke et al.

(10) Patent No.: US 12,571,520 B2
(45) Date of Patent: Mar. 10, 2026

(54) INSERT FOR A LIGHT EMITTING DEVICE

(71) Applicant: SIGNIFY HOLDING B.V., Eindhoven (NL)

(72) Inventors: Oliver Francis Burke, Eindhoven (NL); Marcel Beij, Sint Oedenrode (NL); Barry Mos, Bocholt (BE); Marcus Theodorus Maria Lambooij, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/875,689

(22) PCT Filed: Jun. 21, 2023

(86) PCT No.: PCT/EP2023/066825
§ 371 (c)(1),
(2) Date: Dec. 16, 2024

(87) PCT Pub. No.: WO2024/002827
PCT Pub. Date: Jan. 4, 2024

(65) Prior Publication Data
US 2025/0230920 A1 Jul. 17, 2025

(30) Foreign Application Priority Data
Jun. 28, 2022 (EP) .................................... 22181407

(51) Int. Cl.
*F21V 11/06* (2006.01)
*F21V 7/00* (2006.01)
(Continued)

(52) U.S. Cl.
CPC ............. *F21V 11/06* (2013.01); *F21V 7/0083* (2013.01); *F21Y 2101/00* (2013.01);
(Continued)

(58) Field of Classification Search
CPC .... F21V 11/06; F21V 7/0083; F21Y 2113/13;
F21Y 2101/00; G09F 2013/142;
(Continued)

(56) References Cited

U.S. PATENT DOCUMENTS

2008/0285280 A1 11/2008 Snijder et al.
2009/0067172 A1* 3/2009 Inoue ...................... F21S 8/026
362/240

(Continued)

FOREIGN PATENT DOCUMENTS

CN 108916673 A 11/2018
DE 102005043185 A1 3/2007
(Continued)

OTHER PUBLICATIONS

Machine translation of DE 202017004282 U1 retrieved from the FIT database of PE2E search. (Year: 2025).*

(Continued)

*Primary Examiner* — Colin J Cattanach

(57) ABSTRACT

The present invention relates to a light emitting device (1) comprising a substrate (2) comprising a plurality of individually controllable light sources (3) adapted for, in operation, emitting light, and at least one insert (4) comprising at least partially light-blocking material and having a longitudinal extension being parallel to the substrate (2). The insert (4) comprises a plurality of transverse elements (5) having a proximal end (5') arranged in proximity of the substrate (2) and a distal end (5") arranged at a distance from the proximal end (5'). The transverse elements (5) are substantially perpendicular to the substrate (2), the plurality of transverse elements (5) dividing the substrate into at least a first segment (6') comprising a first group of the light sources (3'), a second segment (6") comprising a second group of the
(Continued)

light sources (3"), and a third segment (6''') comprising a third group of light sources (3''').

13 Claims, 5 Drawing Sheets

(51) Int. Cl.

| | | |
|---|---|---|
| *F21Y 101/00* | (2016.01) | |
| *F21Y 113/13* | (2016.01) | |
| *G02F 1/13357* | (2006.01) | |
| *G09F 13/04* | (2006.01) | |
| *G09F 13/14* | (2006.01) | |

(52) U.S. Cl.
CPC ..... *F21Y 2113/13* (2016.08); *G02F 1/133603* (2013.01); *G02F 1/133605* (2013.01); *G09F 13/0422* (2021.05); *G09F 2013/142* (2013.01); *G09F 2013/145* (2013.01)

(58) Field of Classification Search
CPC .......... G09F 2013/145; G09F 13/0422; G02F 1/133603; G02F 1/133605
See application file for complete search history.

(56) References Cited

U.S. PATENT DOCUMENTS

| | | | |
|---|---|---|---|
| 2012/0018623 A1 | 1/2012 | Dinc et al. | |
| 2015/0345724 A1 | 12/2015 | Leadford et al. | |
| 2017/0175978 A1* | 6/2017 | Geisler .................. | G02B 27/30 |
| 2020/0006297 A1* | 1/2020 | Yamada ............... | H10H 20/857 |
| 2022/0163186 A1 | 5/2022 | Lotti et al. | |

FOREIGN PATENT DOCUMENTS

| | | | | |
|---|---|---|---|---|
| DE | 202017004282 U1 * | 11/2017 | .............. | F21V 11/06 |
| WO | 2004094896 A2 | 11/2004 | | |

OTHER PUBLICATIONS

(55) Pinterest, https://www.pinterest.ca/pin/357051076693680942/, Jan. 4, 2022. Recently reviewed.
Ceiling Light Covers, https://www.ke-99.top/ProductDetail.aspx?iid=115585111&pr=39.96. Recently reviewed.
Drop Ceiling Fluorescent Decorative, https://www.ke-99.top/ProductDetail.aspx?iid=115585155&pr=34.96. Recently reviewed.
Oscar Gypsum Plaster, Bavdhan, Pune, Maharashtra, "Entrance False Ceiling Design, False Ceiling Designing", Jan. 4, 2022, https://www.indiamart.com/proddetail/entrance-false-ceiling-design-13058351662.html.
NEW good price and high quality decorative suspended ceiling panel, Jan. 4, 2022, https://www.alibaba.com/product-detail/NEW-good-price-and-high-quality_927478955.html, 5 pgs.
Https://twitter.com/ironlites (A fluorescent Panel lighting system with graphic design overlays on the lighting system—see also the screen shots of the page—seems similar concept broadly; however, unlike in the ID seems visible). Recently reviewed.
Https://www.amazon.com/Wrought-Iron-Black-White-Marble/dp/B00WIXR22G https://www.amazon.com/Lights-Fluorescent-Covers-Classroom-Office/dp/B09DRMV83H A fluorescent Panel lighting system with graphic design overlays on the lighting system.
Https://www.ke-99.top/ProductDetail.aspx?iid=115585111&pr=39.96 https://www.ke-99.top/ProductDetail.aspx?iid=115585155&pr=34.96 A fluorescent Panel lighting system with graphic design overlays on the lighting system.
Https://www.pinterest.ca/pin/357051076693680942/ https://www.indiamart.com/proddetail/residential-pvc-ceiling-panels-21880108730.html https://www.indiamart.com/proddetail/entrance-false-ceiling-design-13058351662.html.
Octo Lights Fluorescent Light Covers for Classroom Office—Eliminate Harsh Glare Causing Eyestrain and Headaches. Office & Classroom Decorations—Flower 001, Jan. 4, 2022, https://www.amazon.com/Lights-Fluorescent-Covers-Classroom-Office/dp/B09DRMV83H. Recently reviewed. 8 pgs.
Rectangular Residential PVC Ceiling Panels, Rs 250 /square feet Afjal Enterprises | ID: 21880108730, Jan. 4, 2022, https://www.indiamart.com/proddetail/residential-pvc-ceiling-panels-21880108730.html.
Ironlites, https://www.lightsonline.com/search.html?query=ironlites&page=11. 5 pgs. Recently reviewed.

* cited by examiner

205´´

207

204

205´

205

INSERT FOR A LIGHT EMITTING DEVICE

CROSS-REFERENCE TO PRIOR APPLICATIONS

This application is the U.S. National Phase application under 35 U.S.C. § 371 of International Application No. PCT/EP2023/066825, filed on Jun. 21, 2023, which claims the benefit of European Patent Application No. 22181407.2, filed on Jun. 28, 2022. These applications are hereby incorporated by reference herein.

FIELD OF THE INVENTION

The invention relates to a light emitting device comprising an insert and to a luminaire comprising such a light emitting device.

BACKGROUND OF THE INVENTION

LED lighting tiles designed to fit in drop ceilings are typically backlit using an array of LEDs on the rear of the panel. Alternatively, side-lit panels use a lightguide plate to distribute the light from LEDs mounted on the side of the panel. The arrangement of LEDs in a back-lit panel, e.g. Philips Ledinaire (600 mm×600 mm), may be in 6 rows each comprising 9 LEDs.

Further, it is known to provide a pattern tile having an insert dividing the tile in two individually controllable segments. Such pattern tiles may be combined in different configurations and operated such that an illumination pattern is obtained. To achieve this effect, it is important to have a good contrast between the illuminated and non-illuminated regions of the tile. This can be done by segmenting the tile using a light blocking element and addressing the LEDs within each segment separately.

However, there is still a need for an improved insert to be used with a LED panel, such that diversity of patterns obtainable by operating different segments of the LED panel may be increased.

US20080285280A1 discloses a lighting module comprising an array of LEDs arranged on a carrier, a mesh arranged at the carrier, and a front diffuser plate arranged in front of the mesh.

SUMMARY OF THE INVENTION

It is therefore an object of the invention to provide a light emitting device comprising an insert, such that an increased flexibility in patterns obtainable by the light emitting device is provided. To this end, the present invention provides a light emitting device comprising a substrate comprising a plurality of individually controllable light sources adapted for, in operation, emitting light. The plurality of light sources may be arranged in straight parallel rows, circles, rectangles or in any other desired pattern across the substrate. The light sources may be LED light sources. Arranging the light sources in parallel rows offers the advantage of a simplified insert configuration.

The light emitting device further comprises at least one insert comprising at least partially light-blocking material, e.g. semi-transparent material.

The insert has a longitudinal extension being parallel to the substrate. The longitudinal extension of the insert is preferably the same as or slightly shorter than the longitudinal extension of the substrate. The insert comprises a plurality of transverse elements having a proximal end (i.e.

a proximal edge) arranged in proximity of the substrate and a distal end (i.e. a distal edge) arranged at a distance from the proximal end. The distance between the proximal end and the distal end may be from 1 cm to 20 cm. The transverse elements are arranged substantially perpendicularly to the substrate. By the term "substantially perpendicularly" is meant being arranged at 90° relative to the substrate or arranged at an angle slightly deviating from 90° relative to the substrate. For instance, the transverse element may be arranged at an angle from 80° to 100° relative to the substrate. It is further conceivable that the transverse elements are arranged at different angles relative to the substrate. Such an embodiment offers the advantage of enhanced optical performance of the light emitting device.

The plurality of transverse elements divides the substrate into at least a first segment comprising a first group of the light sources, a second segment comprising a second group of the light sources, and a third segment comprising a third group of light sources. The different groups of light sources may be operated individually such that desired pattern is created. The number of segments may be at least five, at least ten or at least fifteen. Increased number of segments provides for an increased number of available patterns.

The plurality of transverse elements may be arranged in a straight configuration, in curved configuration, or in a combination thereof. The transverse elements may be intersecting.

The plurality of transverse elements may be integrally formed as a single piece, thus forming a single insert. Alternatively or additionally, the transverse elements may be formed as separate parts. In such an embodiment, the transverse element may be mutually connected and/or arranged on the substrate in a specific pattern to form the at least one insert at a later stage of the manufacturing/ assembling step of the light emitting device.

Each transverse element of the plurality of transverse elements has a length Ld in the longitudinal direction essentially parallel to the plane of the substrate, a thickness T, and a height H from the proximal end to the distal end. The thickness T and the height H are measured perpendicular to the light direction. The height H of the transverse elements is measured substantially perpendicularly to the plane of the substrate, e.g. 90°±10° to the substrate. The length, height and/or thickness of each transverse element may be same as or different from the length, height and/or thickness of the other transverse elements.

The distal end of each transverse element may have a straight or smoothly curved shaped profile which is different from the shaped profile of the proximal end of each transverse element which may be straight, stepped straight or stepped curved. Stepped straight or stepped curved configuration offers the advantage of avoiding intersection of the transverse elements with the light generating/emitting part of any light source of the plurality of light sources while these light sources can still be advantageously arranged, for example in a convenient, square grid. Viewed in projection on a plane along the height of the transverse elements, in the embodiment wherein, for example, the proximal end has a stepped profile and the distal end is smoothly curved, the transverse element gradually transforms/changes in shape over its height from the stepped profile to a different, for example smooth, profile.

The light emitting device may comprise a light exit window being arranged substantially parallelly to the substrate such that the distal end of the at least one transverse element is arranged in proximity of or in contact with the light exit window by which cross-talk (light leakage)

between neighboring segments is counteracted. If the distal end of the transverse element is arranged in proximity of the light exit window, the distance between the distal end of the transverse element and the light exit window preferably should not exceed the thickness of the distal end of the transverse element.

The light exit window may be a diffuse transmissive sheet. Alternatively, or additionally, the light exit window may be a light collimating plate. Depending on the beam profile for a specific desired function of the light emitting device, such an embodiments offer the advantage of improved matching optical performance.

The distal end of the transverse element may have a thickness below 0.2 mm. Such an embodiment offers the advantage of providing a virtually invisible insert, in particular when the light emitting device further comprises a light exit window panel arranged in proximity of or in contact with the distal end of the transverse element. It should be noted that the thickness of the transverse elements may be non-uniform. In particular the transverse elements may have a thickness decreasing from the proximal end to the distal end.

The insert may comprise a frame, and the transverse elements may be arranged within the frame. The frame may have any suitable shape and size, e.g. rectangular, square, oval, circular or the like. The frame may facilitate manufacturing, transportation and installation of the insert.

In order to reduce absorbance of light and ensure that that the insert is not visible through the light exit window panel, at least one transverse element in the plurality of transverse elements may comprise a reflective coating. Preferably, all of the transverse elements comprise reflective coating. Such an embodiment offers the advantage of providing improved optical performance of the light emitting device.

Depending on the configuration of the light sources and the transverse elements of the frame, at least one light source may become covered by a transverse element, which impairs the contrast between the segments of the light emitting device resulting in a poor optical pattern. In order to avoid this undesired effect, the proximal end of at least one transverse element may be non-straight. In such an embodiment, the proximal end of the at least one transverse element would not intersect any light source of the plurality of light sources. The term "non-straight" in the context of the present invention may mean a stepped or a zig-zac configuration.

In order to maximize optical efficiency, at least the distal ends of at least one transverse element may be white. Furthermore, it may be important to ensure that the light emitted by the light sources does not pass from the luminated to the non-luminated segment. Then the transverse elements should be fully blocking for light, either by absorption and/or reflection, for example in that semi-transparent material of the transverse elements is coated with a reflective, non-transparent coating.

The insert of the present invention may be manufactured by 3D printing, e.g. by means of fused deposition modeling (FDM). Alternatively, the insert may be manufactured by means of injection modeling.

The present invention further relates to a luminaire comprising a light emitting device according to the above. The luminaire may further comprise a fixation element configured to support the light emitting device. Such a fixation element may be a wire, a screw, a hook, or the like. In a particular embodiment, the luminaire is configured for a suspended configuration.

BRIEF DESCRIPTION OF THE DRAWINGS

This and other aspects of the present invention will now be described in more detail, with reference to the appended drawings showing embodiments of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
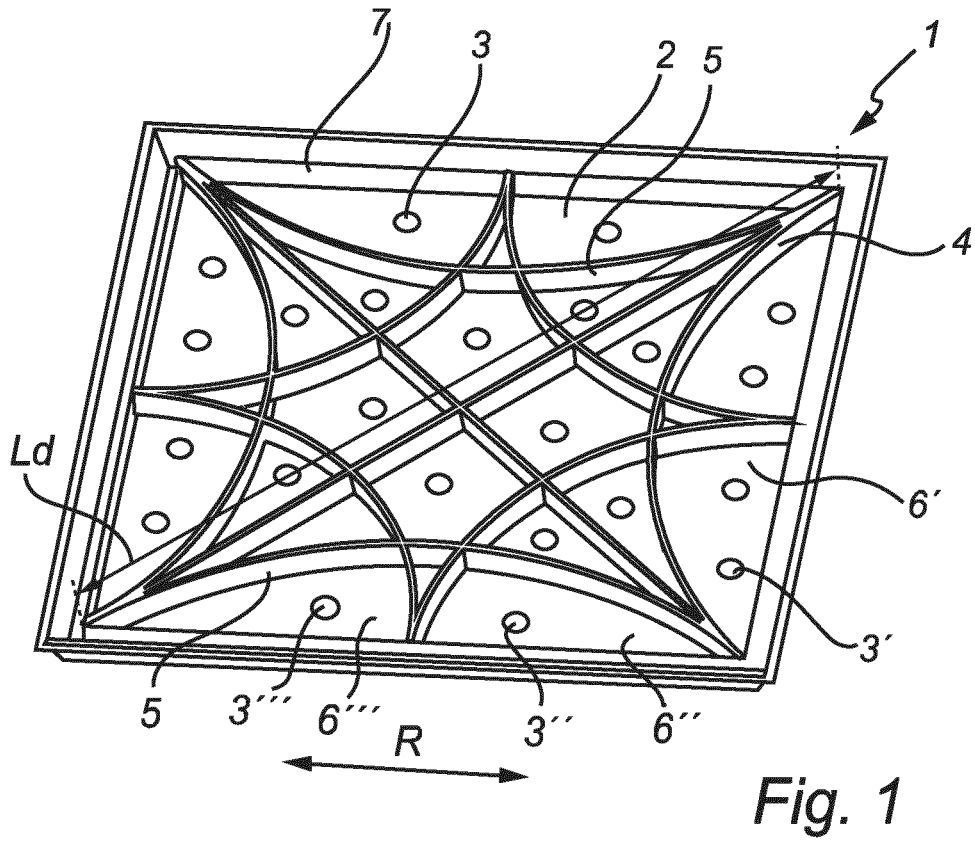
FIG. 1 shows a perspective view of a light emitting device comprising insert according to the present invention.

FIG. 1 illustrates a light emitting device 1 comprising a substrate 2 comprising a plurality of individually controllable light sources 3 adapted for, in operation, emitting light. The plurality of light sources 3 is arranged in rows.

The light emitting device 1 further comprises an insert 4 comprising at least partially light-blocking material, e.g. semi-transparent material.

The insert 4 has a longitudinal extension R being parallel to the substrate 2. The longitudinal extension R of the insert is the same as the longitudinal extension of the substrate 2. The insert 4 comprises a plurality of transverse elements 5 having a proximal end 5' arranged in proximity of the substrate 2 and a distal end 5" arranged at a distance from the proximal end 5'. The distance between the proximal end 5" and the distal end 5" may be from 1 cm to 20 cm. The transverse elements 5 are arranged substantially perpendicularly to the substrate 2. It is further conceivable that the transverse elements 5 are arranged at different angles relative to the substrate 2. Such an embodiment offers the advantage of enhanced optical performance of the light emitting device 1.

Each transverse element of the plurality of transverse elements has a length Ld in the longitudinal direction essentially parallel to the plane of the substrate, a thickness T, and a height H from the proximal end to the distal end. The thickness T and the height H are measured perpendicular to the light direction. The height H of the transverse elements is measured substantially perpendicularly to the plane of the substrate, e.g. 90°±10° to the substrate. The length, height and/or thickness of each transverse element may be same as or different from the length, height and/or thickness of the other transverse elements.

The plurality of transverse elements 5 divides the substrate 2 into at least a first segment 6' comprising a first group of the light sources 3', a second segment 6" comprising a second group of the light sources 3", and a third

5

Figures 3A, 3B, 3C:
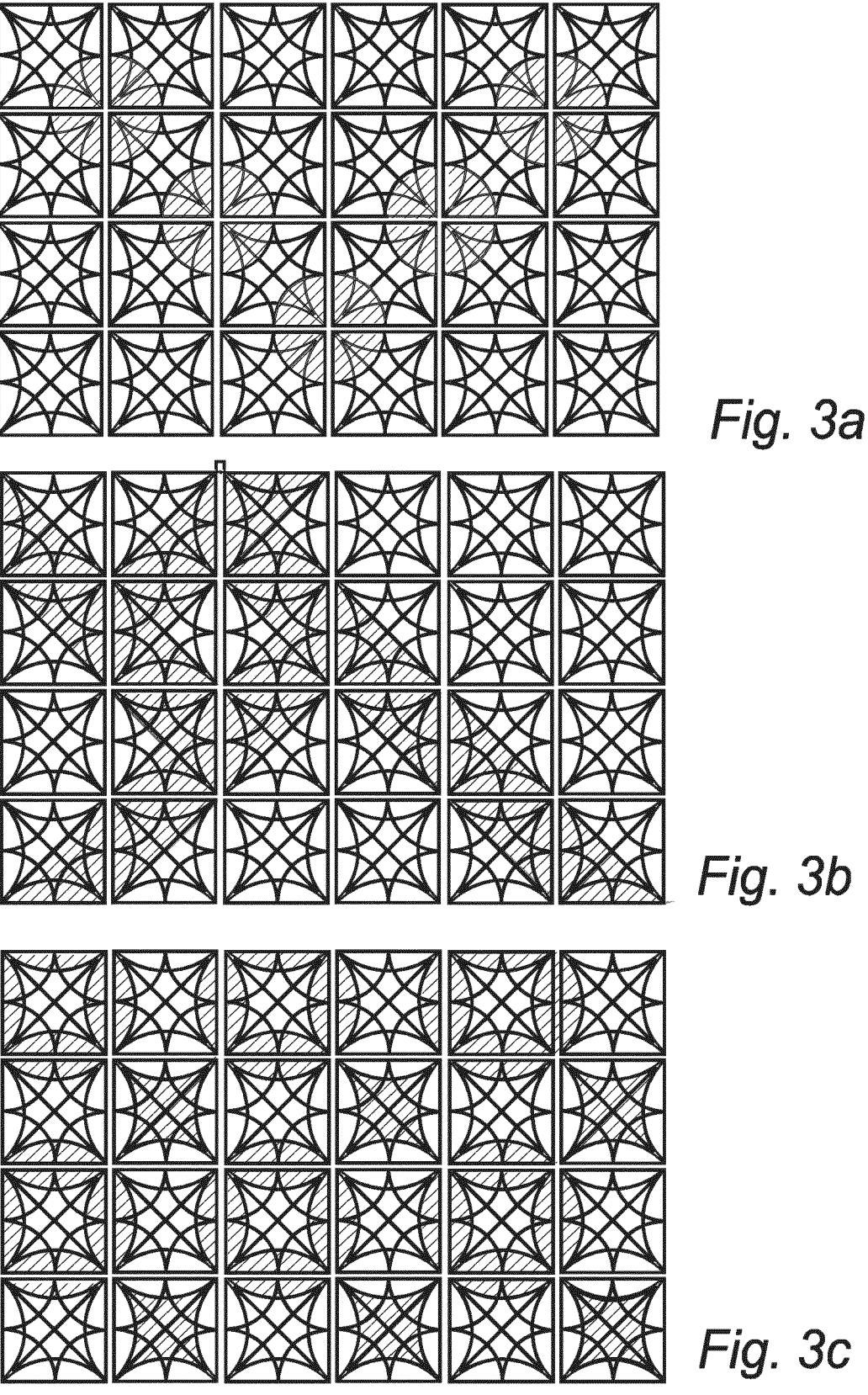
FIGS. 3A-3C show different patterns obtainable in the light emitting device according to the present invention.

6 segment 6''' comprising a third group of light sources 3'''. The different groups of light sources 3', 3'' and 3''' may be operated individually such that desired pattern is created. The number of segments may be at least five, at least ten or at least fifteen. Increased number of segments provides for an increased number of available patterns. The different patterns that may be provided by the insert are depicted in FIGS. 3A-3C.

The plurality of transverse elements 5 are arranged in a combination of straight configuration and curved configuration. In particular, the insert 4 comprises eight curved transversed elements and four straight elements. The transverse elements 5 are intersecting.

The light emitting device 1 comprises a light exit window 8 being arranged substantially parallelly to the substrate 2 such that the distal end 5'' of the at least one transverse element 5 is arranged in contact with the light exit window 8.

The light exit window 8 may be a diffuse transmissive sheet. Alternatively, or additionally, the light exit window 8 may be a light collimating plate.

The insert 4 may comprise a frame 7, and the transverse elements 5 may be arranged within the frame 7. In the shown figures the frame 7 is square, but as said it may have any suitable shape.

Figure 2:
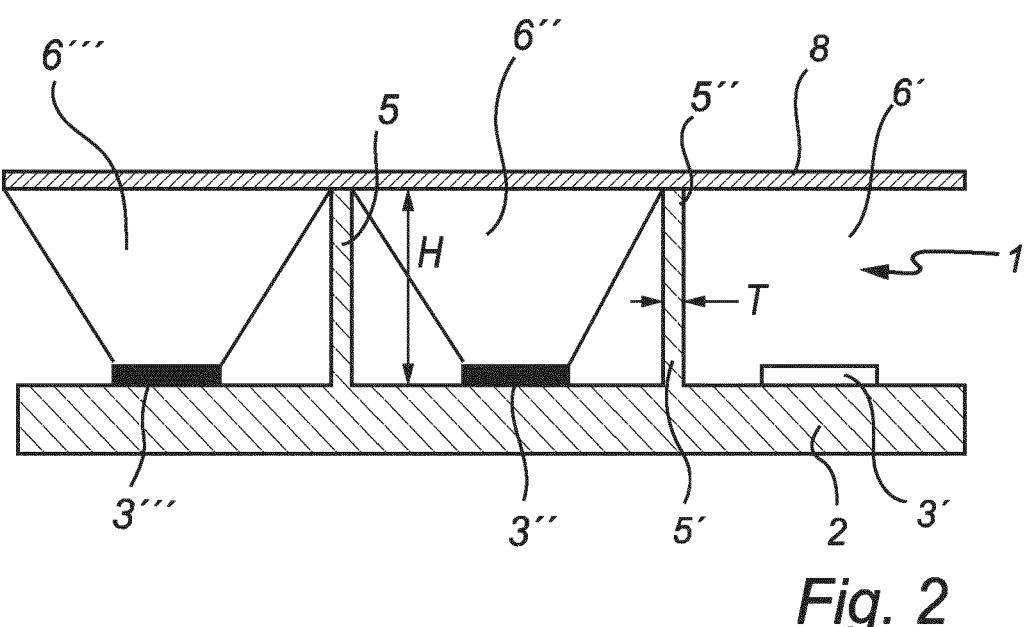
FIG. 2 shows a cross-sectional view of a light emitting device according to the invention.

As may be seen in FIG. 2, the light sources 3', 3'' and 3''' are individually controllable. Thus, in the embodiment shown in FIG. 2, the first group of light sources 3' in the first segment 6' is switched off, while the second and the third groups of the light sources 3'' and 3''' are switched on.

Figure 4A:
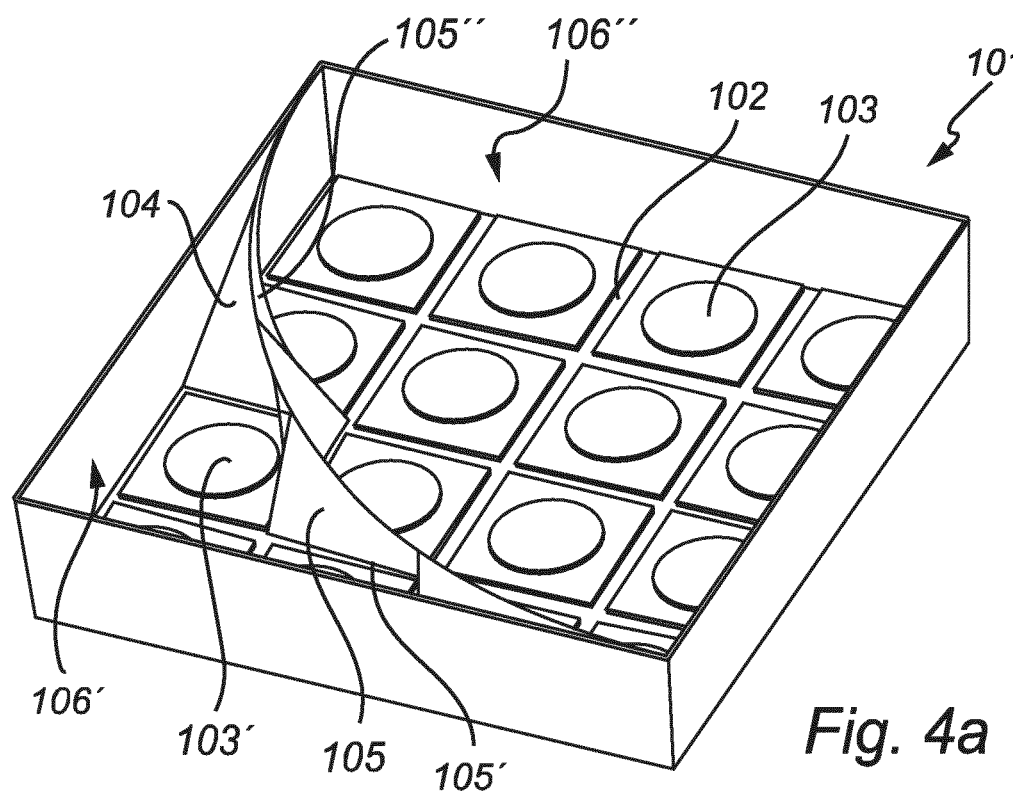
FIGS. 4A and 4B illustrate the embodiment of the insert of the present invention providing improved pattern edges.
Figure 4B:
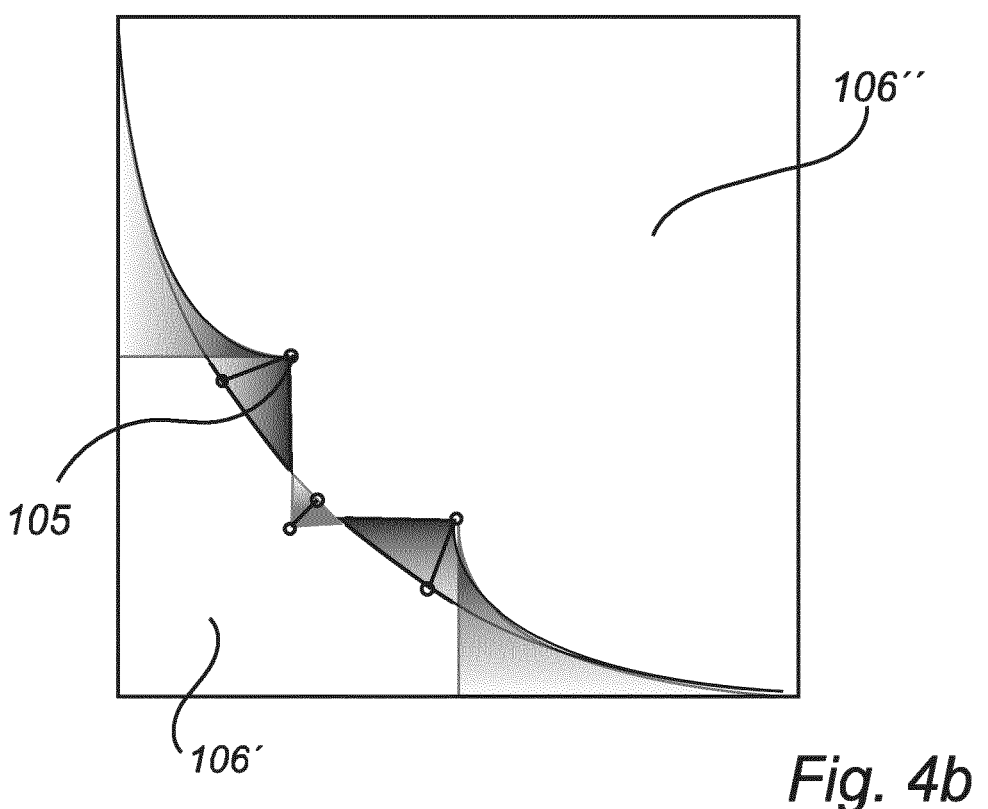

FIG. 4a depicts a light emitting device 101 comprising a substrate 102. As mentioned above, depending on the configuration of the light sources 103 and the transverse elements 105 of the insert 104, at least one light source may become covered by a transverse element, which impairs the contrast between the segments of the light emitting device resulting in a poor optical pattern. In order to avoid this undesired effect, the proximal end 105' of at least one transverse element 105 may be non-straight, as shown in FIG. 4A and 4B. In such an embodiment, the proximal end 105' of the at least one transverse element 105 would not intersect any light source of the plurality of light sources 103. The term "non-straight" in the context of the present invention may mean a stepped or a zig-zac configuration.

As mentioned above, the distal end 105'', 205'' and 305'' of each transverse element 105, 205, 305 may be straight or smoothly curved. The proximal end 105', 205', 305' of each transverse element 105, 205, 305 may be straight, stepped straight or stepped curved. As mentioned above, stepped straight or stepped curved configuration offers the advantage of avoiding intersection of the transverse elements with the light generating/emitting part of any light source 106 of the plurality of light sources, as illustrated in FIG. 4a. As may be seen in FIGS. 4a, 5a and 6a, when the proximal end has a stepped profile and the distal end is smoothly curved, viewed in projection on a plane along the height of the transverse elements, the transverse element gradually transforms/changes in shape over its height from the stepped profile to the smooth profile.

Figure 5A:
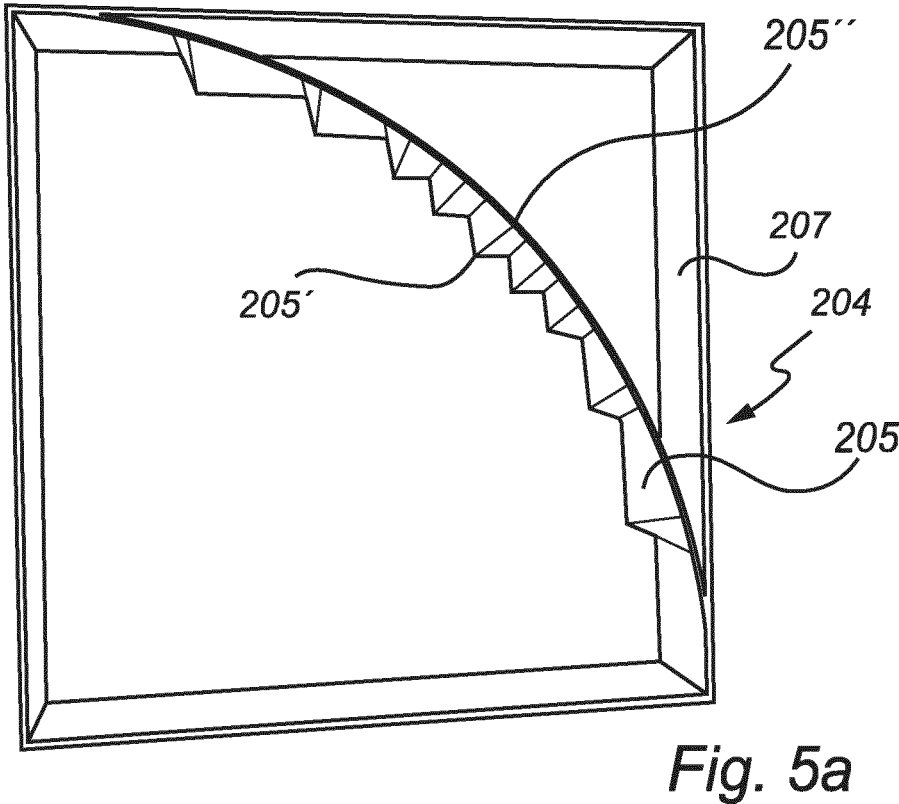
FIG. 5A-6B show different embodiments of the insert similar to the one shown in FIGS. 4A-4B.
Figure 5B:
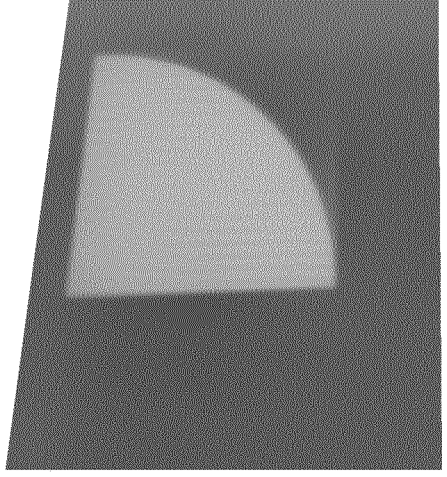
Figure 6A:
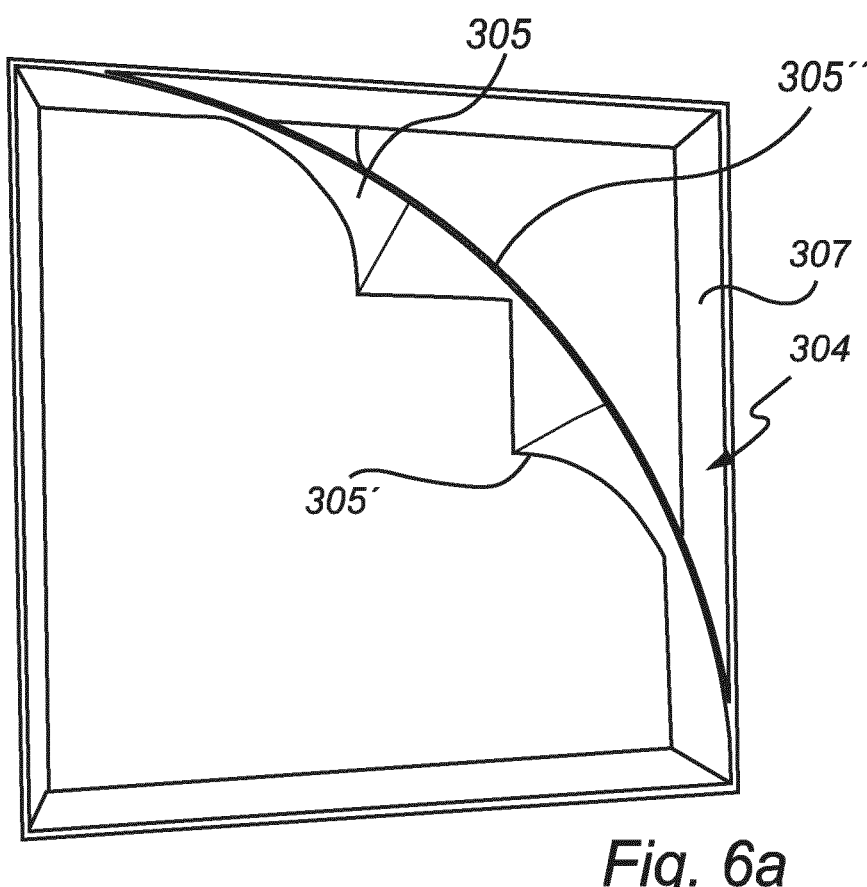
Figure 6B:
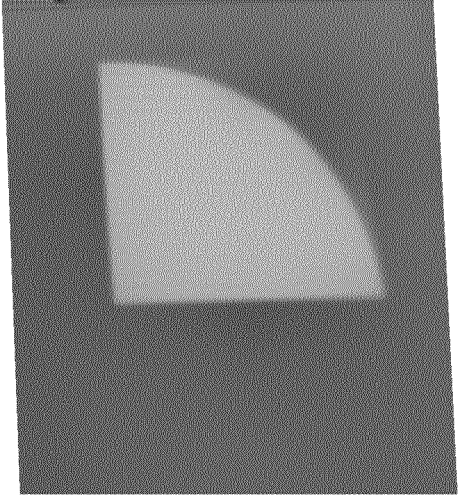

FIG. 5A depicts an embodiment of a light emitting device 201 comprising a substrate 202 and an insert 204 wherein the proximal end 205' of the insert 205 has a pleated configuration, thus providing a sharp contract as may be seen in FIG. 5B. Such an insert may be used if the light emitting device comprises many small light sources. Another embodiment is shown in FIG. 6A, wherein the proximal end 305' of the insert 305 has only two non-straight portions. As may be seen in FIG. 6B, even in this case the contrast between the illuminated and the non-illuminated segments is good.

The person skilled in the art realizes that the present invention by no means is limited to the preferred embodiments described above. On the contrary, many modifications and variations are possible within the scope of the appended claims. For example, if the emitted light is highly directional it would not need a beam shaping element to fulfill the requirement of this invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A light emitting device comprising:
   a substrate comprising a plurality of individually controllable light sources adapted for, in operation, emitting light, at least one insert comprising a partially light-blocking material and having a longitudinal extension being parallel to said substrate, said insert comprising a plurality of transverse elements having a proximal end arranged in proximity of said substrate and a distal end arranged at a distance from said proximal end, said transverse elements being substantially perpendicular to said substrate, said plurality of transverse elements dividing said substrate into at least a first segment comprising a first group of said light sources, a second segment comprising a second group of said light sources, and a third segment comprising a third group of light sources,
   wherein the proximal end of at least one transverse element does not intersect any light source of said plurality of light sources,
   wherein the at least one transverse element gradually transforms/changes in shape over its height to a different profile at the distal end, and
   wherein viewed in projection on a plane along the height of the transverse elements, the at least one transverse element is non-straight, and the proximal end has a stepped profile and the distal end is smoothly curved and wherein the at least one transverse element gradually transforms/changes in shape over its height from the stepped profile to the smooth profile.

2. The light emitting device according to claim 1, wherein the distal end of said at least one transverse element has a thickness below 0.2 mm.

3. The light emitting device according to claim 1, wherein said transverse elements are intersecting.

4. The light emitting device according to claim 1, wherein said insert comprises a frame and wherein said transverse elements are arranged within said frame.

5. The light emitting device according to claim 1, wherein at least one transverse element in said plurality of transverse elements comprises a reflective coating.

6. The light emitting device according to claim 1, wherein said plurality of light sources are arranged in parallel rows across said substrate.

7. The light emitting device according to claim 1, wherein said light emitting device further comprises a light exit window being arranged substantially parallelly to said substrate such that said distal end of said at least one transverse element is arranged in proximity of or in contact with said light exit window.

8. The light emitting device according to claim 7, wherein said light exit window is a diffuse transmissive sheet.

9. The light emitting device according to claim 7, wherein said light exit window is a light collimating plate.

10. The light emitting device according to claim 7, wherein at least said distal end of said transverse element is white.

11. The light emitting device according to claim 1, wherein said insert is manufactured by a fused deposition modeling (FDM).

12. A luminaire comprising a light emitting device according to claim 1 and a fixation element configured to support the light emitting device.

13. The luminaire according to claim 12, wherein said luminaire is configured for a suspended configuration.

* * * * *